(12) United States Patent
Williamson

(10) Patent No.: US 8,087,564 B2
(45) Date of Patent: *Jan. 3, 2012

(54) APPARATUS FOR FORMING A METALLIC CONTAINER

(75) Inventor: James T. Williamson, Urbana, OH (US)

(73) Assignee: New Sonic Technologies, LLC, Bonita, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/834,246

(22) Filed: Jul. 12, 2010

(65) Prior Publication Data

US 2011/0014013 A1    Jan. 20, 2011

Related U.S. Application Data

(60) Division of application No. 11/634,609, filed on Dec. 6, 2006, now abandoned, which is a continuation-in-part of application No. 11/313,111, filed on Dec. 20, 2005, now Pat. No. 7,748,101.

(51) Int. Cl.
*B23K 1/06* (2006.01)
*B23K 37/00* (2006.01)
*B29C 65/00* (2006.01)
*B67B 5/00* (2006.01)

(52) U.S. Cl. ...... 228/1.1; 228/2.1; 228/44.3; 156/580.2; 53/485

(58) Field of Classification Search .......... 53/329, 53/329.2, 353, 371.8; 228/1.1–2.3, 110.1–114.5; 156/73.1–73.4, 76.3, 73.5, 580, 580.1, 580.2, 156/358

See application file for complete search history.

(56) References Cited

U.S. PATENT DOCUMENTS

| | | | | |
|---|---|---|---|---|
| 1,912,677 A | * | 6/1933 | Williams | 53/300 |
| 2,845,325 A | * | 7/1958 | Seitz | 445/70 |
| 2,946,119 A | | 7/1960 | Jones et al. | 29/470 |
| 3,029,666 A | | 4/1962 | Lovins | 78/82 |
| 3,184,841 A | | 5/1965 | Jones et al. | 29/470 |
| 3,306,488 A | | 2/1967 | Lemelson | 220/63 |
| 3,316,135 A | * | 4/1967 | Brown et al. | 156/69 |
| 3,499,068 A | * | 3/1970 | Brown | 264/68 |
| 3,562,078 A | * | 2/1971 | Zumstein | 220/62.11 |
| 3,690,088 A | * | 9/1972 | Anderson et al. | 53/452 |
| 3,732,613 A | | 5/1973 | Steigerwald | 228/112.1 |
| 3,789,183 A | | 1/1974 | Conley | 219/92 |

(Continued)

FOREIGN PATENT DOCUMENTS

FR    1320632    1/1963

(Continued)

*Primary Examiner* — Kiley Stoner
*Assistant Examiner* — Carlos Gamino
(74) *Attorney, Agent, or Firm* — Brinks Hofer Gilson & Lione

(57) ABSTRACT

A method of forming a metallic container by placing body and lid portions together, keeping parts of the body and lid portions in contact with one another, and vibrating the lid with respect to the body, thereby generating frictional heat to form a friction metallic weld therebetween. Apparatus for attaching the lid and body portions of the metallic container includes a body supporting base, an assembly to support a flange of the body, a sonotrode to contact a flange of the lid so that wherein the flanges of the lid and body are held together between the support assembly and the sonotrode. A motor vibrates the sonotrode relative to the support assembly to thereby move the flanges relative to one another generating sufficient frictional heat to create a friction metallic weld therebetween.

28 Claims, 9 Drawing Sheets

U.S. PATENT DOCUMENTS

| | | | |
|---|---|---|---|
| 3,824,145 A * | 7/1974 | Flax | 56/580 |
| 3,899,116 A | 8/1975 | Mims | 228/110 |
| 3,934,780 A * | 1/1976 | Flax | 228/2.3 |
| 3,993,519 A * | 11/1976 | Birkhold | 156/73.5 |
| 4,036,397 A | 7/1977 | Walraven et al. | 220/268 |
| 4,047,657 A | 9/1977 | Mims | 228/103 |
| RE29,448 E * | 10/1977 | Brown et al. | 156/73.5 |
| 4,075,820 A * | 2/1978 | Standley | 53/329.4 |
| 4,247,346 A | 1/1981 | Maehara et al. | 156/73.5 |
| 4,259,419 A * | 3/1981 | Uba et al. | 429/174 |
| 4,377,428 A * | 3/1983 | Toth | 156/73.5 |
| 4,462,849 A * | 7/1984 | MacLaughlin et al. | 156/73.5 |
| 4,496,095 A | 1/1985 | Renshaw et al. | 228/102 |
| 4,584,037 A * | 4/1986 | Fortuna et al. | 156/69 |
| 4,601,927 A * | 7/1986 | Durfee | 428/543 |
| 4,749,437 A | 6/1988 | Welter | 156/580.1 |
| 4,767,492 A | 8/1988 | Fukusima et al. | 156/580 |
| 4,892,227 A | 1/1990 | MacLaughlin | 220/450 |
| 4,989,479 A * | 2/1991 | Anderson et al. | 81/424.5 |
| 5,064,485 A * | 11/1991 | Smith et al. | 156/69 |
| 5,082,160 A | 1/1992 | Leigh | 228/110 |
| 5,085,719 A | 2/1992 | Eck | 156/73.4 |
| 5,096,052 A | 3/1992 | Raque et al. | 198/803.01 |
| 5,279,625 A | 1/1994 | O'Neil-Bell | 29/623.4 |
| 5,345,747 A | 9/1994 | Raque et al. | 53/478 |
| 5,549,236 A * | 8/1996 | Reinhardt | 228/114.5 |
| 5,697,545 A | 12/1997 | Jennings et al. | 228/112.1 |
| 5,739,215 A | 4/1998 | Westerhof et al. | 525/438 |
| 5,830,300 A | 11/1998 | Suzuki et al. | 156/73.1 |
| 5,833,127 A * | 11/1998 | Powell et al. | 228/102 |
| 5,927,536 A | 7/1999 | Oyagi et al. | 220/266 |
| 6,032,835 A | 3/2000 | Burt | 222/402.1 |
| 6,251,203 B1 * | 6/2001 | Vala et al. | 156/73.1 |
| 6,296,726 B1 * | 10/2001 | Pencak | 156/64 |
| 6,726,084 B2 | 4/2004 | Duncan, Jr. | 228/112.1 |
| 6,802,920 B2 | 10/2004 | Shinohara et al. | 156/73.1 |
| 6,860,412 B1 | 3/2005 | Burt | 222/402.1 |
| 7,299,602 B2 * | 11/2007 | Denom et al. | 53/331 |
| 7,448,184 B2 | 11/2008 | Clark et al. | 53/453 |
| 7,497,917 B2 | 3/2009 | Chen et al. | 156/73.5 |
| 7,581,667 B2 * | 9/2009 | Reinold et al. | 228/110.1 |
| 7,661,193 B2 * | 2/2010 | Kishi | 29/890.126 |
| 7,698,797 B2 * | 4/2010 | Hetrick et al. | 29/505 |
| 7,748,101 B2 | 7/2010 | Williamson | 29/521 |
| 7,748,590 B2 * | 7/2010 | Reatherford et al. | 228/1.1 |
| 2003/0021920 A1 | 1/2003 | Williamson et al. | 428/34.1 |
| 2003/0113416 A1 | 6/2003 | Wycliffe et al. | 426/131 |
| 2006/0231585 A1* | 10/2006 | Dieterle | 228/101 |
| 2007/0137020 A1 | 6/2007 | Williamson | 29/525 |
| 2010/0158640 A1 | 6/2010 | Williamson | 413/2 |
| 2010/0199484 A1 | 8/2010 | Williamson | 29/525 |

FOREIGN PATENT DOCUMENTS

| | | |
|---|---|---|
| JP | 4201236 | 7/1992 |
| WO | WO 95/23668 | 9/1995 |

* cited by examiner

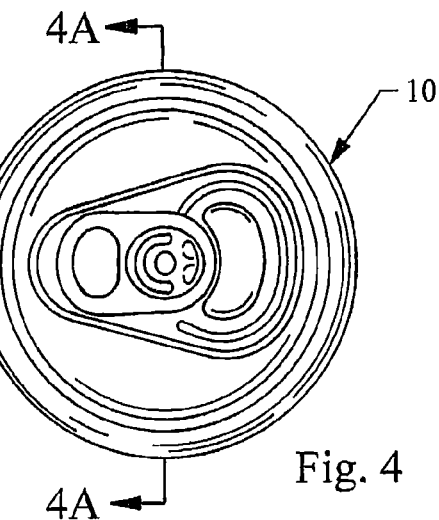
Fig. 4
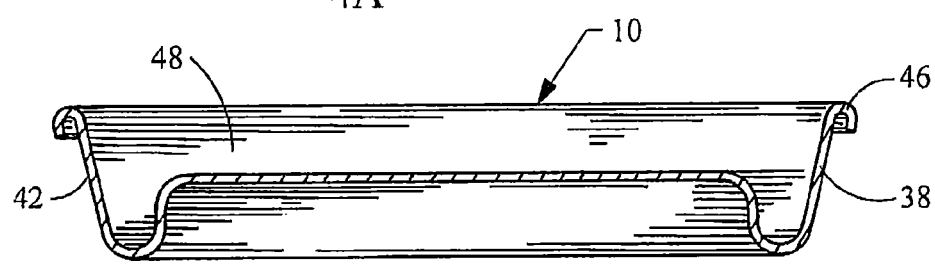
Fig. 4A
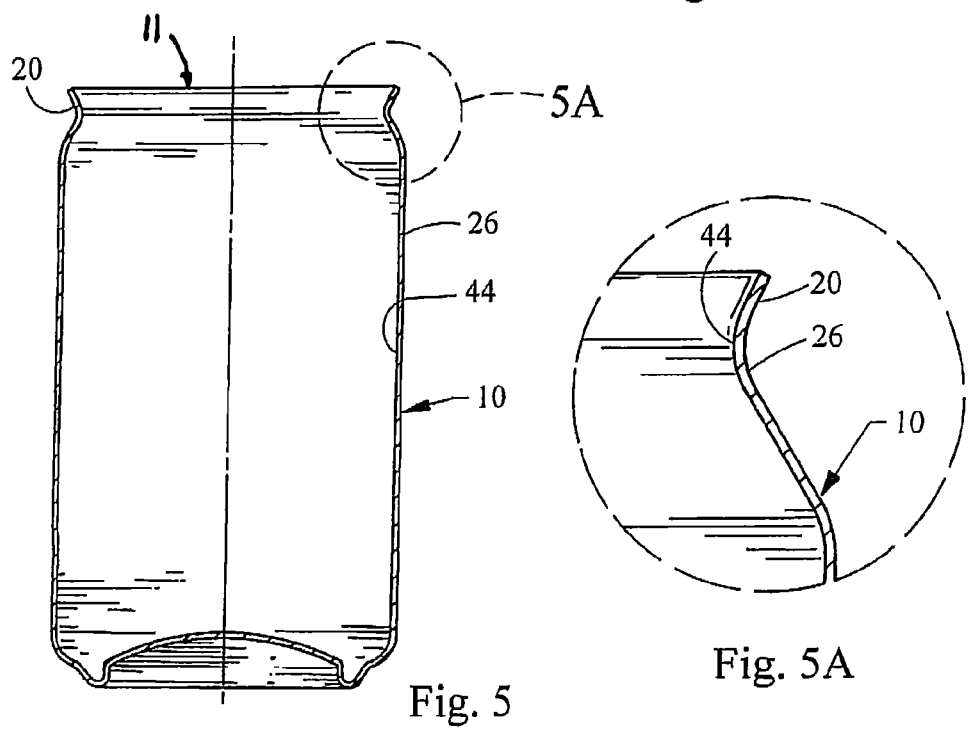
Fig. 5
Fig. 5A

APPARATUS FOR FORMING A METALLIC CONTAINER

CROSS-REFERENCE TO RELATED APPLICATIONS

This application is a division of application Ser. No. 11/634,609 filed Dec. 6, 2006 now abandoned, which is a continuation-in-part of application Ser. No. 11/313,111 filed Dec. 20, 2005, now U.S. Pat. No. 7,748,101 which issued on Jul. 6, 2010, each of which is incorporated herein by reference in its entirety.

BACKGROUND

The invention generally relates to a method an apparatus for attaching the lid portion to the body portion of a metallic container, particularly a metallic food container such as an aluminum beverage can.

Metallic containers, particularly those intended for food products, must be structurally robust, be made from materials compatible with food products, and generally incorporate internal coatings to make them suitable for food contents. Generally, metallic food containers, such as carbonated beverage cans, have a pre-formed body portion and a pre-formed lid portion that is attached to the body portion after the beverage is placed therein. The body portion is usually formed from a single piece of suitable metallic material, such as aluminum, and is shaped by stamping, drawing, ironing, and/or other suitable metal forming process. The lid portion is formed in much the same manner. The body portion can be very thin after forming, and therefore, the lid portion desirably contributes to the structural rigidity for the finished container. The lid portion can be made from a material that is relatively harder than the body portion.

One known method of attaching the lid portion onto the body portion of the metallic container involves rolling or curling parallel flange portions of the lid and the body portion onto each other to form a lip seam. This process generally provides a good seal, and does not compromise the integrity of any coatings that may be placed on the interior of the metallic container. A variety of coatings can be used on the interior surfaces of the lid portion and the body portion of the container, which are preferably satisfactory for food contact, to prevent corrosion of the inner surface of the metallic food container and to prevent the metal from contaminating the taste of the food placed therein. The coating can be any of the materials identified, for example, in U.S. Pat. No. 5,739,215, which are hereby incorporated by reference. Typically, the body portion and the lid portion have the inner surfaces coated prior to the lid portion being attached to the body portion. Therefore, any attachment technique must account for and accommodate the coating.

By rolling the edges of the lid portion and the body portion onto one another, a tight seal is formed, and the coating is not compromised. However, this method of attachment requires extra metallic material to allow for portions to be rolled over onto one another in this manner. Additionally, typically in this process a vinyl seal or gasket can be placed between the edges of the lid portion and the body portion before they are rolled onto one another. This gasket material helps insure an adequate seal.

Other techniques can be used to reduce the amount of metallic material by directly connecting the edges by welding or soldering the edges together, by a process such as laser welding. This process will also provide a sealed attachment, however the temperatures necessary for this type of welding are high enough to compromise or destroy any coating placed on the inner surface of the body portion and the lid portion. This leaves an uncoated region immediately adjacent the area of the weld. Still other methods may use an intermediate material, with a lower melting point, between the lid portion and the body portion, to allow the lid portion and the body portion to be welded together, via the intermediate material, at a lower temperature.

Further, the processes discussed above, either rolling the edges of the lid portion and the body portion over onto one another, or welding the edges together require significant time to complete, thereby making the manufacture of these metallic containers more costly. The lid is generally attached to the body of the metallic container after the contents of the container have been placed therein. In the case of a carbonated beverage, as soon as a seal forms between the lid and the body of the metallic container, pressure will start to build within the container. This can cause carbonated beverage to be pushed between the lid and the body as the seal is being formed, thereby compromising the quality of the seal. Also, specifically with carbonated beverages, the portion of the beverage that leaks from within the container during the process of attachment makes a mess within the manufacturing facility.

Therefore, there is a need for an apparatus and method of forming a metallic container that will allow for a reduction in the amount of material used while providing a sealed attachment between the lid portion and the body portion without compromising any food compatible coatings placed on the inner surfaces of the lid portion and the body portion. Furthermore, there is a need for an apparatus and method of forming a metallic container that will reduce the cycle time of prior methods used to attach the lid to the body of a metallic container.

SUMMARY

In one aspect, an apparatus for attaching a lid portion to a body portion of a metallic container can include a base adapted to support the body portion of the metallic container when placed thereon, and a support assembly, movable relative to the base. The support assembly can have a support surface adapted to support an outer surface of a flange portion of the body of the metallic container. A reciprocally vibratable sonotrode having a friction surface can be moved relative to the support assembly between a retracted position and an engaged position. With a lid portion placed onto the body portion of the metallic container, the support assembly can engage the outer surface of the flange portion of the body of the metallic container. The sonotrode can be moved to the engaged position, so that confronting portions of the lid and the body of the metallic container are held in contact with one another between the support surface of the support assembly and the friction surface of the sonotrode. A motor can vibrate the sonotrode relative to the support assembly, thereby moving the lid portion of the container relative to the body portion of the container. The vibrational mode can be one of rotational vibration around a longitudinal axis of the container, or linear vibration parallel to the axis, or any combination thereof such as an orbital vibration or even a random vibration. The relative movement can be such that frictional forces generated by the vibrational motion can wipe out any coating materials on the contacting surfaces of the lid portion and body portion of the container, and can create a friction weld between the materials forming the lid and body portions of the container.

In another aspect, the motor can be adapted to vibrate the sonotrode at a rate of approximately 20 KHz, and the apparatus further includes an actuator for advancing and retracting the sonotrode between the engaged position and the retracted position. When the sonotrode is moved to the engaged position, the actuator can move the sonotrode downward in stages such that the sonotrode exerts an initial downward force to hold portions of the lid and the body of the metallic container in contact with one another between the support surface of the support assembly while the coating materials on the contacting surfaces are wiped out. The term "wiped out" is intended to connote the destruction and/or displacement of the coating materials on the confronting contacting surfaces or the lid portion and body portion of the container. Following the wipe out of the coating materials, the downward force can be increased to create the friction weld between the materials forming the lid and body portions of the container. The actuator can provide a downward force of up to 7200 N, but most typically, provides a downward force of approximately 2200 N.

In still another aspect, the support assembly can include a frame and a clamshell anvil. The clamshell anvil can take the form of two halves that are pivotally mounted onto opposing portions of the frame. The two halves of the pivotally mounted clamshell anvil can be pivotally moveable between an open position and a closed position and can be biased to the open position.

In yet another aspect, the sonotrode can be supported on a shaft having a cammed outer surface. Portions of the pivotally mounted clamshell anvil halves can engage the cammed outer surface, such that when the sonotrode is in the retracted position, the pivotally mounted clamshell anvil halves can engage the shaft at a point where the shaft can allow the clamshell anvil halves to pivot to the open position. When the shaft and the sonotrode begin to move downward, the cammed outer surface of the shaft can be used to force the clamshell anvil halves to pivot to the closed position so that the support surface can engage the rim portion of the body of the container. The cammed outer surface of the shaft can be shaped such that the clamshell anvil halves can be forced to pivot to the closed position prior to the sonotrode reaching the engaged position.

In still another aspect, at least one of the clamshell anvil halves can include a stop extending from an inner surface of the clamshell anvil half. The stop can be positioned vertically above the support surface, such that when the sonotrode retracts from the lid of the metallic container after welding, if the lid portion sticks to the friction surface of the sonotrode, the stop can contact the lid portion, to thereby hold the metallic container down as the sonotrode retracts upward.

In yet another aspect, the support surface of the support assembly can have a textured surface such that the support surface can frictionally engage the outer surface of the rim portion of the body of the metallic container to prevent sliding movement of the rim portion of the body relative to the support surface. The friction surface of the sonotrode can also have a textured surface such that the friction surface will frictionally engage the lid portion of the metallic container to prevent sliding movement of the lid relative to the friction surface. The textured surfaces can take a variety of forms including, without limitation, a criss-crossed knurl pattern, a diamond shaped knurl pattern, a vertically aligned knurl pattern, a raised serpentine ridge pattern, sand-blasted grit surface. Some forms of the textured surfaces can result in surprisingly enhanced performance.

In still another aspect, an interior surface of the body portion and the lid portion of the metallic container can include a protective coating. When the sonotrode is moved to the engaged position, the sonotrode can exert a downward force to hold portions of the lid and the body of the metallic container in contact with one another between the support surface of the support assembly and the friction surface of the sonotrode. The downward force of the sonotrode and the frequency of vibrational motion of the sonotrode can be such that the frictional heat generated from the reciprocal relative motion between the lid portion and the body portion is sufficient to create a friction weld between the lid portion and the body portion of the metallic container, and sufficiently low not to cause break-down of the coating in the areas immediately inwardly adjacent to the frictional weld.

In still another aspect, the friction surface of the sonotrode and the support surface of the support assembly can be oriented at almost any angle down to approximately five degrees to seven degrees relative to the longitudinal axis of the apparatus. Additionally, the friction surface of the sonotrode can be shaped to focus the vibrational energy at a specifically desired portion of the adjoining container body and lid.

In another aspect, a method of forming a metallic container includes the steps of providing a pre-formed body portion, providing a pre-formed lid portion, placing the lid portion onto the body portion and applying a force to keep portions of the lid portion and the body portion held in contact with one another, and vibrating the lid portion with respect to the body portion, thereby generating frictional heat between the lid portion and the body portion such that a friction weld is formed therebetween.

The above, as well as other advantages of the present invention will become readily apparent to those skilled in the art from the following detailed description of a preferred embodiment when considered in the light of the accompanying drawings.

DESCRIPTION OF THE DRAWINGS

FIG. 4 is a top view of the lid portion of a metallic container.

FIG. 4A is a sectional view taken along line 4A-4A of FIG. 4.

FIG. 5 is a side sectional view of the body portion of a metallic container.

FIG. 5A is an enlarged view of a portion of FIG. 5 as indicated by the area labeled "5A" in FIG. 5.

DESCRIPTION OF ILLUSTRATIVE EMBODIMENTS

Figure 1:
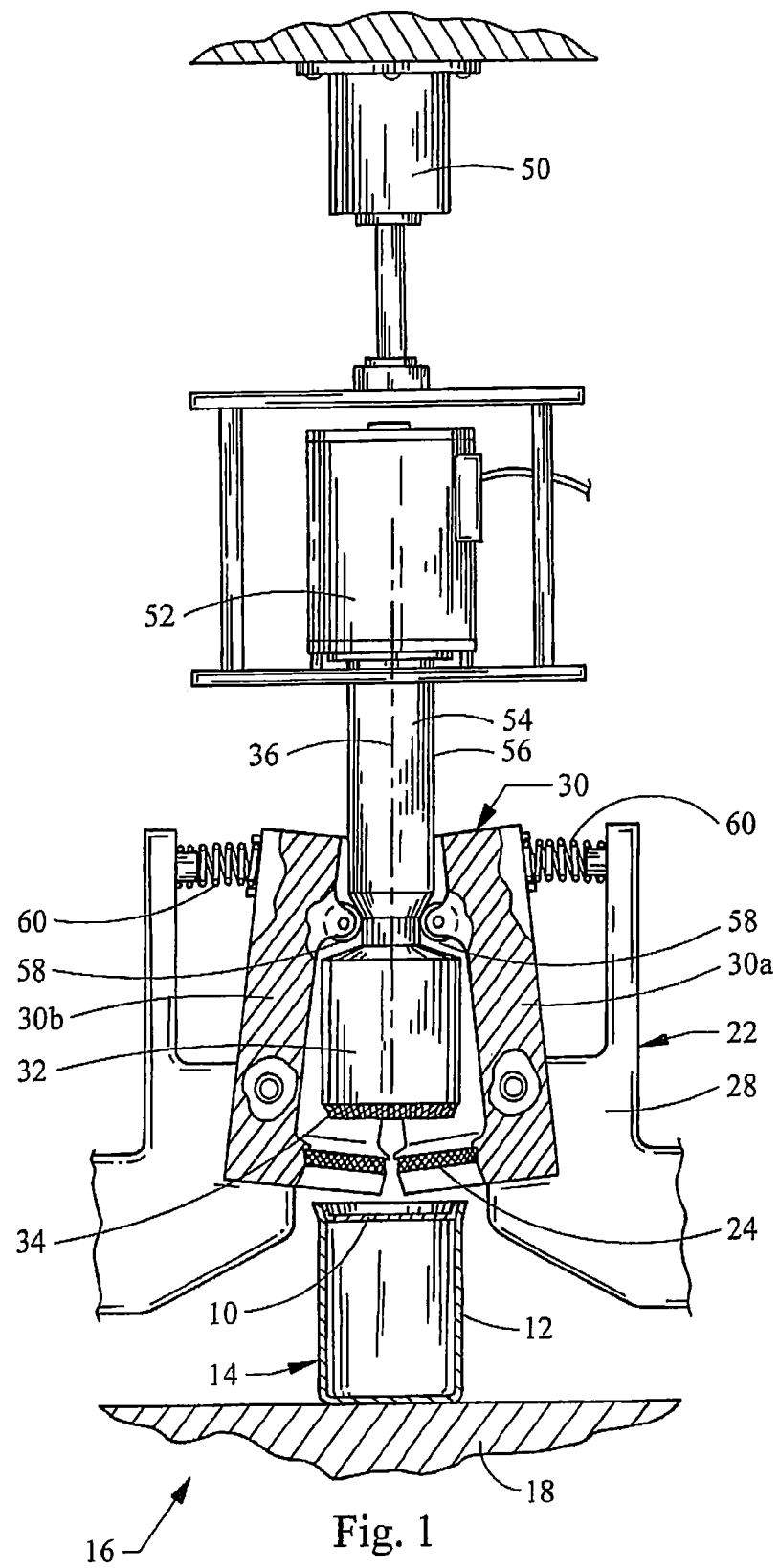
FIG. 1 is a partial sectional view of an apparatus in accordance with the present invention, wherein a sonotrode is in the fully retracted position.
Figure 2:
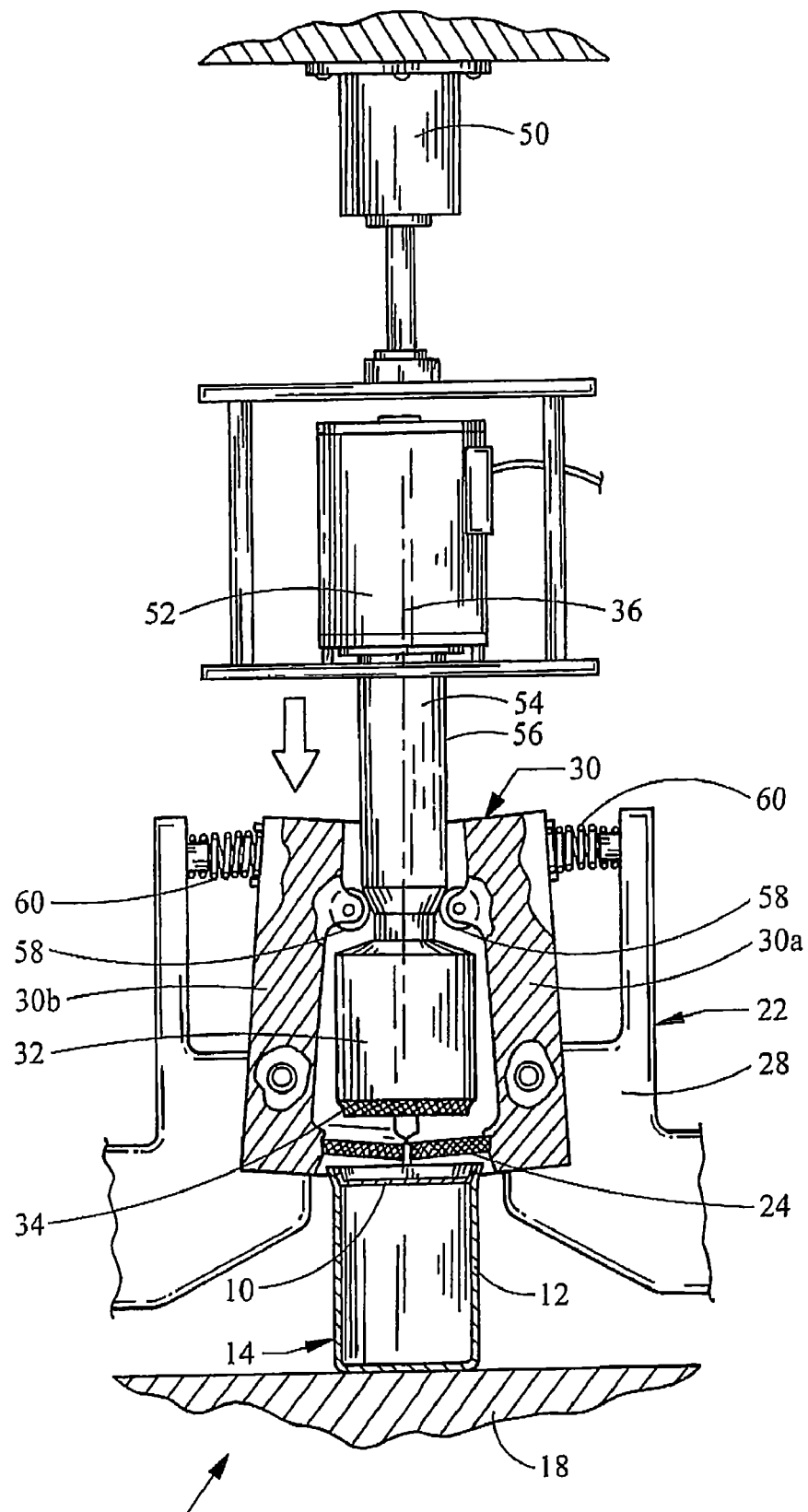
FIG. 2 is a view similar to FIG. 1, wherein the sonotrode is moving downward toward the engaged position.
Figure 3:
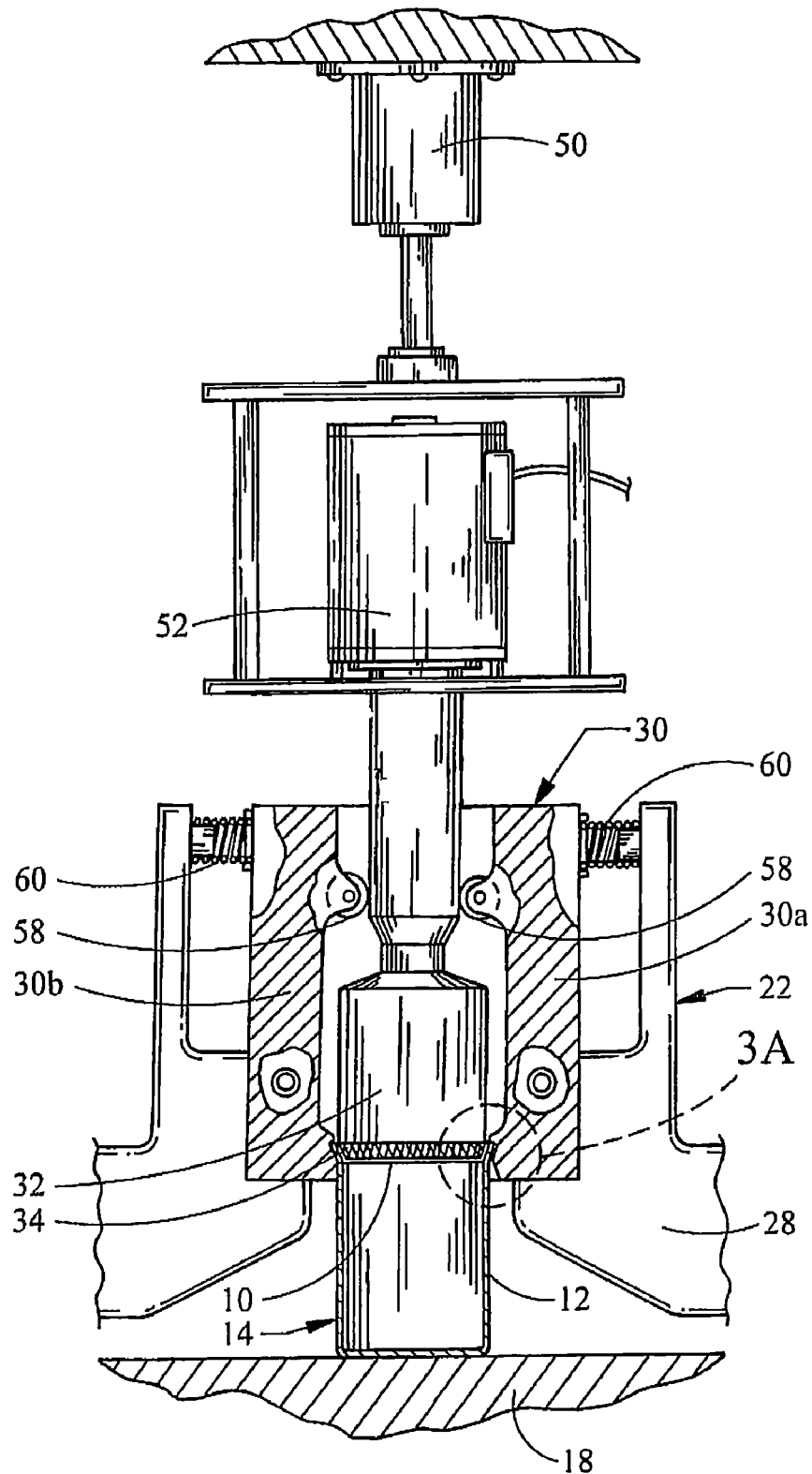
FIG. 3 is a view similar to FIG. 1, wherein the sonotrode is in the engaged position.

Referring to FIG. 1, an apparatus for attaching a lid portion 10 to a body portion 12 of a metallic container 14 is shown generally at 16. The apparatus 16 is shown to include a base 18 that is adapted to support the body portion 12 of the metallic container 14 when placed thereon. Referring to FIGS. 5 and 5A, the body portion 12 of the metallic container 14 is generally cylindrically shaped and open at one end 11. The open end 11 includes an angled flange 20 extending circumferentially around the open end 11. A support assembly 22, shown in FIGS. 1, 2 and 3, is movable relative to the base 18 and is shown to include a support surface 24 adapted to support an outer surface 26 of the flange 20.

Figure 3A:
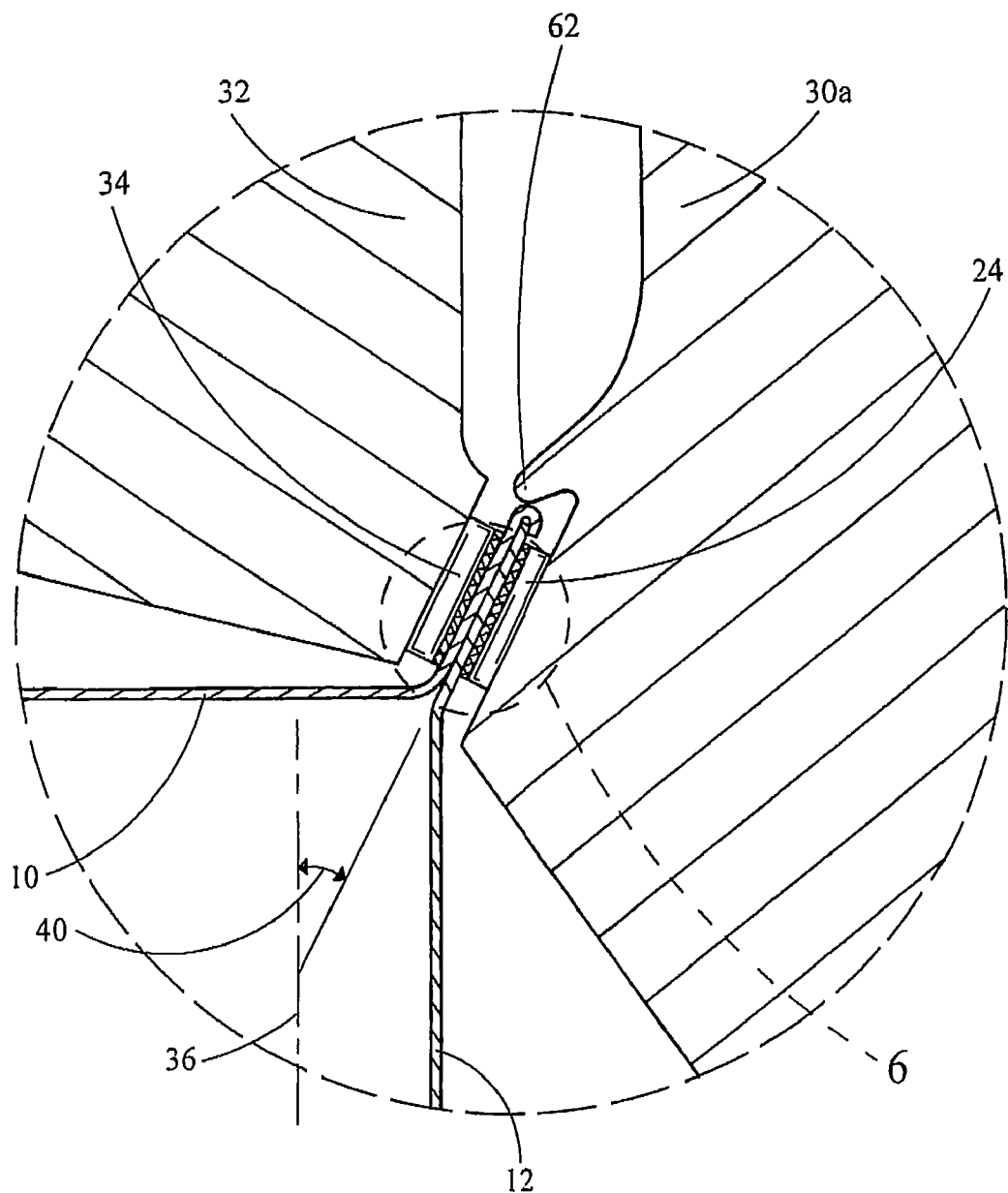
FIG. 3A is a close up view of a portion of FIG. 3 as indicated by the area labeled "3A" in FIG. 3.
Figure 3B:
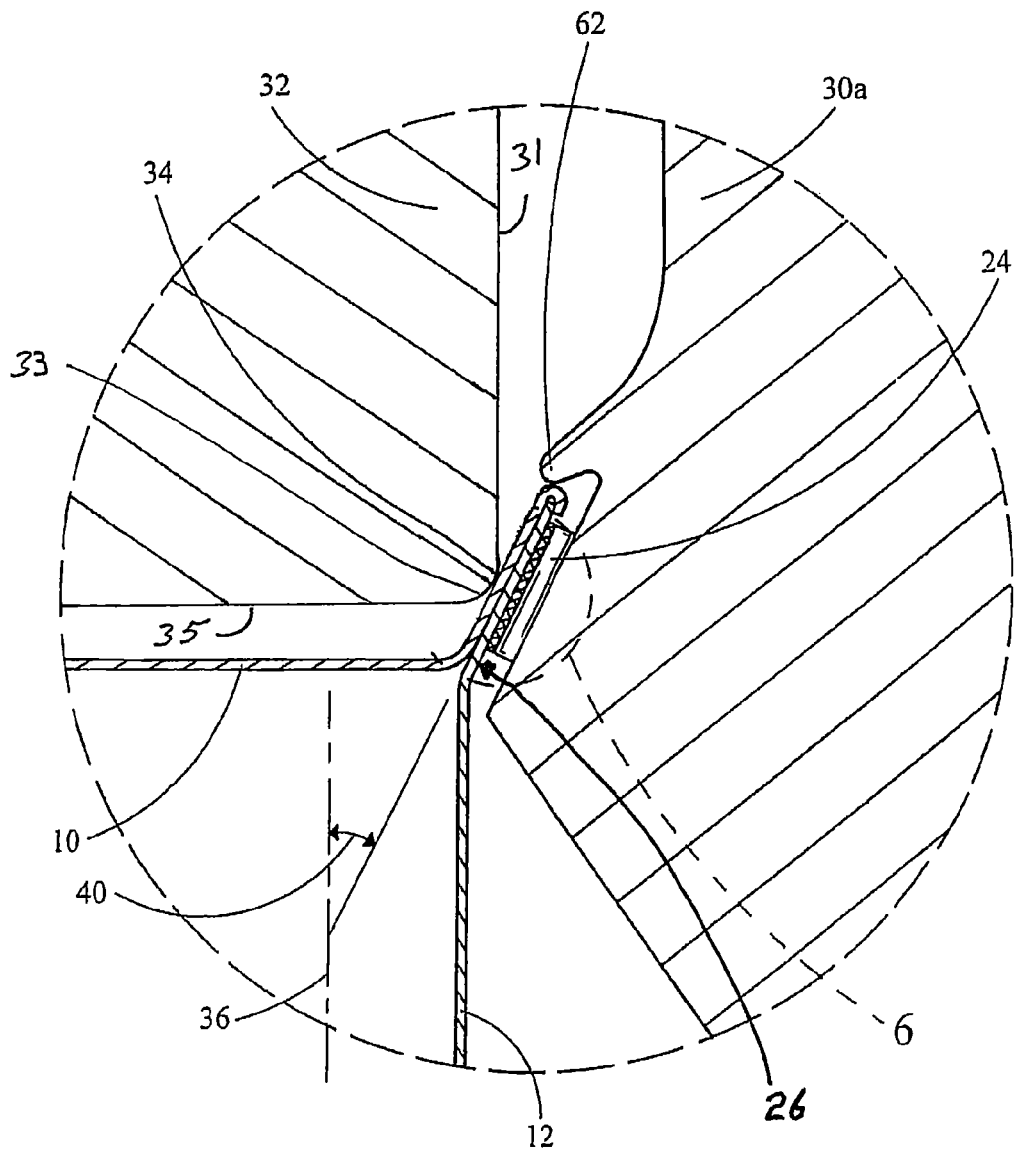
FIG. 3B is a close up view similar to that of FIG. 3a showing an alternative sonotrode end surface.

The support assembly 22 includes a frame 28 and a clamshell anvil 30. The clamshell anvil 30 includes two halves 30A, 30B that are pivotally mounted onto opposing portions of the frame 28. The two halves 30A and 30B of the clamshell anvil 30 pivot between an open position shown in FIG. 1 and a closed position shown in FIG. 3. Referring to FIG. 1, in the open position, the support surface 24 is pivoted away from the flange 20 of the body portion 12, thereby allowing the body portion 12 to be loaded and unloaded from the base 18. Referring to FIGS. 3, 3A and 3B, in the closed position, the two halves of the clamshell anvil 30 are pivoted inward such that the support surface 24 contacts and supports the outer surface 26 of the flange 20 of the body portion 12.

A reciprocally vibratable and vertically moveable sonotrode 32 is mounted vertically above the base 18. The sonotrode 32 includes a friction surface 34 on a lower outer edge of the sonotrode 32. The sonotrode 32 is moveable linearly, along a longitudinal axis 36, relative to the support assembly 22 between a retracted position, shown in FIG. 1, and an engaged position, shown in FIG. 3. Referring to FIG. 1, in the retracted position, the sonotrode 32 is positioned vertically above the base 18 as well as the body portion 12 and lid portion 10 of the metallic container 14 situated on the base 18. Referring to FIG. 3, 3A and 3B, after the support assembly 22 engages the outer surface 26 of the flange 20 of the body 12 of the metallic container 14, the sonotrode 32 is moved by actuator 50 to the engaged position, wherein the friction surface 34 of the sonotrode 32 contacts the lid portion 10 of the metallic container 14.

Referring to FIGS. 4 and 4A, the lid portion 10 of the metallic container 14 is generally disk shaped and includes an angled flange 38 extending circumferentially around the disk perimeter. The angle 40 of the flange 20 on the body portion 12 is approximately equal to the angle 40 of the flange 38 on the lid portion 10 of the metallic container 14, such that when the lid portion 10 is placed onto the body portion 12, an inner surface 42 of the flange 38 on the lid portion 10 contacts a confronting inner surface 44 of the flange 20 on the body portion 12. The flange 38 on the lid portion 10 includes a curled lip 46 which curls outward such that when the lid portion 10 is placed onto the body portion 12, the curled lip 46 overlies the distal end of the flange 20 on the body portion 12. The angled flanges 20 and 38 on the lid and the body portions 10 and 12, and the curled lip 46 of the flange 38 on the lid portion 10, make loading the lid portion 10 to the body portion 12 quick and simple. Furthermore, the lid portion 10 and the body portion 12 are self-centering with one another so that additional tooling is not necessary to keep the components 10 and 12 centered during the welding process.

When the sonotrode 32 is moved to the engaged position, the friction surface 34 contacts an outer surface 48 of the flange 38 on the lid portion 10. When the sonotrode 32 is in the engaged position, the flange 38 on the lid portion 10 and the flange 20 on the body portion 12 are held in immediate adjacency or contact with one another between the support surface 24 of the support assembly 22 and the friction surface 34 of the sonotrode 32, as best shown in FIGS. 3A and 3B.

An actuator 50 moves the sonotrode 32 between the retracted position and the engaged position. The actuator 50 pushes the sonotrode 32 downward such that when the sonotrode 32 is moved to the engaged position, the sonotrode 32 exerts a downward force to hold the flanges 20 and 38 of the lid and the body portions 10 and 12 of the metallic container 14 in contact with one another between the support surface 24 of the support assembly 22 and the friction surface 34 of the sonotrode 32. When the sonotrode 32 is moved to the engaged position, the actuator 50 can move the sonotrode 32 downward in stages such that the sonotrode 32 exerts an initial downward force to hold flange 20 and 38 of the lid 10 and the body 12 of the metallic container 14 in contact with one another between the support surface 24 of the support assembly 22 and the friction surface 34 of the sonotrode 32, while the coating materials on the contacting surfaces 42 and 44 are wiped out. Following the wipe out of the coating materials, the downward force can be increased to create the friction weld between the materials forming the lid portion 10 and the body portion 12 of the container 14. The actuator 50 is adapted to provide a downward force between approximately 1300 N and approximately 7200 N. Preferably, the downward force applied during the welding of the surfaces 42 and 44 is approximately 2200 N.

A motor 52 is adapted to reciprocally vibrate the sonotrode 32 relative to the support assembly 22. Reciprocal movement of the sonotrode 32 relative to the support assembly 22 moves the lid portion 10 relative to the body portion 12. The motor 52 can be adapted to reciprocally rotate the sonotrode 32 around the longitudinal axis 36 of the apparatus. The motor 52 can also be adapted to linearly reciprocate the sonotrode 32 substantially parallel to the longitudinal axis 36 of the apparatus. The motor 52 can also be adapted to provide a combination of such motions relative to the longitudinal axis 36 of the apparatus to achieve the desired weld between the flanges 20 and 38 of the lid 10 and the body 12. The motor 52 is adapted to vibrate the sonotrode 32 at a rate of between 15 KHz and 25 KHz. Preferably, the sonotrode 32 is vibrated with about 5 kW of power at a frequency of approximately 20 KHz. This vibrational movement can create the frictional wear necessary to wipe out any protective coating on the surfaces 42 and 44, and can create the heat between the flanges 20, 38 of the lid portion 10 and the body portion 12, such that a friction weld is formed between the flanges 20, 38 of the lid portion 10 and the body portion 12 of the metallic container 14.

Preferably, the sonotrode 32 is made from powered metal, and may be tuned using sound waves to control the amplitude of the motion at the point of contact between the friction surface 34 and the flange 38 of the lid portion 10. The amplitude of the motion can be important and is dependant upon several factors, including, but not limited to, the diameter at the point of contact between the flange 38 of the lid portion 10 and the friction surface 34 of the sonotrode 32, the magnitude of the downward force on the sonotrode 32, the thickness of the flanges 20, 38 of the lid portion 10 and the body portion 12, etc. For example, the amplitude of vibrational motion for a typical carbonated beverage container would be on the scale of between about $10^{-3}$ cm and $10^{-2}$ cm, and more particularly between approximately $5\times10^{-3}$ cm and $6.5\times10^{-3}$ cm. Where the vibrational motion is wholly or partially rotational about the longitudinal axis 36 of the apparatus, the amplitude of rotational vibrational motion is typically about 0.1° of arc.

The sonotrode 32 is supported on a shaft 54 extending between the motor 52 and the sonotrode 32. The shaft 54 can have a cammed outer surface 56. Portions of the pivotally mounted clamshell anvil halves 30A, 30B can engage the cammed outer surface 56. Referring to FIGS. 1-3, each half 30A, 30B of the clamshell anvil 30 is shown to include a rolling contact 58. The support assembly 22 can include springs 60 that bias the halves 30A, 30B of the clamshell anvil 30 away from the closed position and keep the rolling contacts 58 held against the cammed outer surface 56 of the shaft 54. When the sonotrode 32 is in the retracted position, the rolling contacts 58 is seen to engage the shaft 54 at a narrow point in the shaft 54, wherein the rolling contacts 58 can move inward and the springs 60 bias the halves 30A, 30B of the clamshell anvil 30 to the open position, as shown in FIG. 1.

As the sonotrode 32 begins to move downward, as shown in FIG. 2, the rolling contacts 58 are shown to follow the cammed outer surface 56 of the shaft 54 and are pushed outward against the biasing springs 60 of the support assembly 22. As the sonotrode 32 moves downward, the rolling contacts 58 are contacting portions of the shaft 54 that are gradually increasing in diameter, such that the rolling contacts 58 are pushed outward, causing the halves 30A, 30B of the clamshell anvil 30 to be pivoted against the biasing springs 60 toward the closed position.

Finally, as the sonotrode 32 and the shaft 54 continue to move downward, the rolling contacts 58 reach a point on the shaft 54 where the diameter of the shaft 54 pushes the rolling contacts 58 outward to a point where the halves 30A, 30B of the clamshell anvil 30 are fully pivoted to the closed position, as shown in FIG. 3. The rolling contacts 58 can reach the point on the shaft 54 where the diameter of the shaft 54 pushes the rolling contacts 58 outward such that the halves 30A, 30B of the clamshell anvil 30 are pivoted to the closed position before the sonotrode 32 contacts the lid portion 10 of the metallic container 14. Specifically, the two halves 30A, 30B of the clamshell anvil 30 can reach the closed position and the support surface 24 contacts the outer surface 26 of the flange 20 on the body portion 12 of the metallic container 14 prior to the friction surface 34 of the sonotrode 32 contacting the flange 38 on the lid portion 10 of the metallic container 14, thus resulting in some lost motion.

This lost motion allows the sonotrode 32 to retract from the lid portion 10 prior to the halves 30A, 30B of the clamshell anvil 30 opening. If the halves 30A, 30B of the clamshell anvil 30 opened immediately upon an upward retracting motion of the sonotrode 32, then the halves 30A, 30B of the clamshell anvil 30 would pivot away from the metallic container 14, and the metallic container 14 could become stuck to the friction surface 34 of the sonotrode 32, requiring manual removal by an operator of the apparatus 16. Referring to FIG. 3A, at least one of the clamshell anvil halves 30A, 30B can include a stop 62 extending from an inner surface 64 of the clamshell anvil half 30A, 30B. The stop 62 can be positioned vertically above the support surface 24, such that when the sonotrode 32 retracts from the lid portion 10 of the metallic container 14 after welding, if the lid portion 10 of the metallic container 14 sticks to the friction surface 34 of the sonotrode 32, the stop 62 will contact the lid portion 10, thereby holding the metallic container 14 down as the sonotrode 32 retracts upward.

The risk of the lid portion 10 sticking to the friction surface 34 of the sonotrode 32 is a real concern, because in order for the friction surface 34 of the sonotrode 32 to grip the flange 38 on the lid portion 10, the friction surface 34 of the sonotrode 32 is generally roughened. The friction surface 34 of the sonotrode 32 can have a pattern formed therein. Examples of patterns that can be used on the friction surface 34 of the sonotrode 32 are shown in FIGS. 9-15. In order to assist in the removal of the sonotrode 32 from the lid portion 10 after welding, the surface of the friction surface 34 can have a vertically oriented knurl 66 formed therein, such as that shown in FIG. 11. Alternatively, a downward pointing triangular shaped knurl pattern 68, such as the one shown in FIG. 10, can be used. These knurl patterns 66, 68, would more readily allow the friction surface 34 of the sonotrode 32 to retract from the lid portion 10 with a reduced chance of the lid portion 10 sticking to the friction surface 34.

Figure 15:
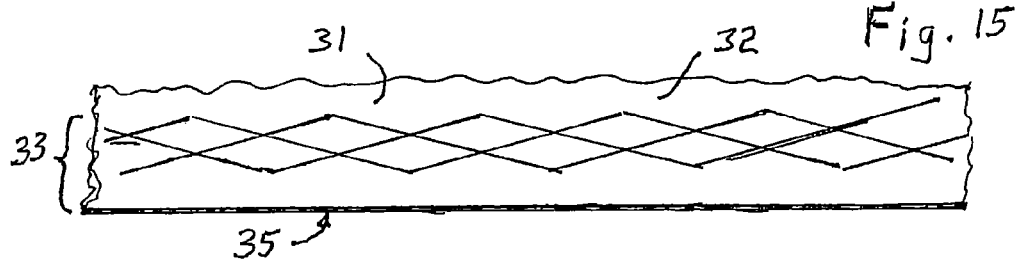
FIG. 15 is an elevation view of a portion of a support surface on a sonotrode wherein the support surface has a flattened criss-crossed knurl pattern formed thereon.
Figure 9:
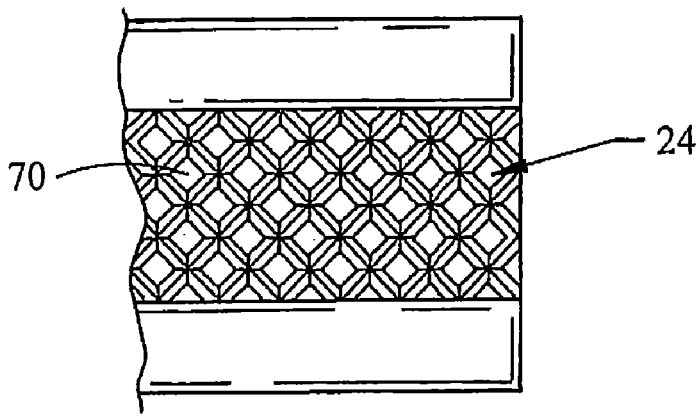
FIG. 9 is a perspective view of a portion of the support surface wherein the support surface has a criss-crossed knurl pattern formed thereon.
Figure 10:
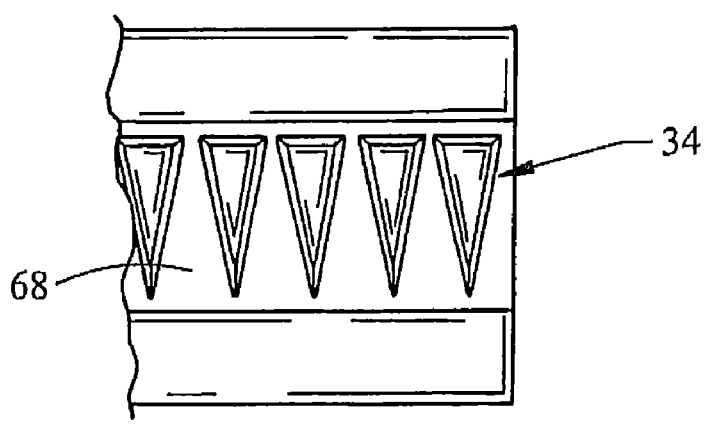
FIG. 10 is a perspective view similar to FIG. 10 wherein the friction surface has a diamond shaped knurl pattern formed thereon.
Figure 11:
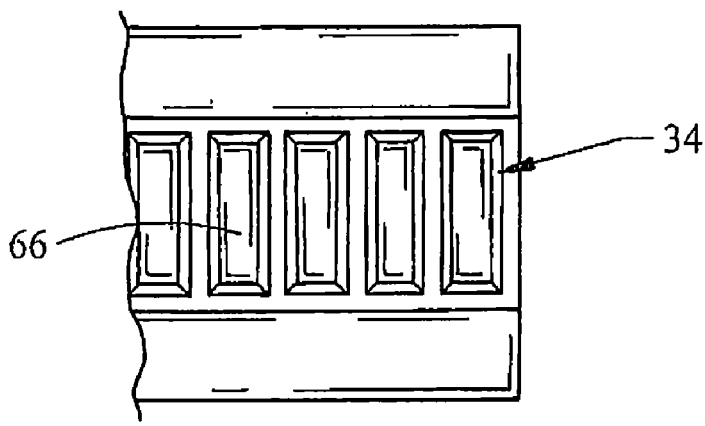
FIG. 11 is a perspective view of a portion of the friction surface on the sonotrode wherein the friction surface has a vertically aligned knurl pattern formed thereon.

Likewise, the support surface 24 of the support assembly 22 can also have a rough surface. This rough surface allows the support surface 24 to grip the outer surface 26 of the flange 20 on the body portion 12 to prevent sliding movement of the flange 20 of the body portion 12 relative to the support surface 24, which may be important in the case of vibrational modes that include a rotational component. As the support surface 24 retracts radially from the outer surface 26 of the body portion 12, the risk of the body portion 12 sticking to the support surface 24 is not as important as with the sonotrode 32 and the lid portion 10, therefore a conventional criss-cross knurl pattern 70 can be used, such as that shown in FIG. 9 or, more preferably as shown in FIG. 15. The knurl pattern 70 shown in FIG. 9 is arranged as intersecting perpendicular grooves arranged at 45° with respect to the longitudinal axis Y. The knurl pattern 70 shown in FIG. 15, on the other hand, is much flatter, being arranged as grooves intersecting at an angle of 30° or less arranged at an angle with respect to the longitudinal axis Y of 75° or greater to provide the necessary mechanical grip of the longitudinal motion of the vertically vibrating sonotrode 32 shown in cross-section in FIG. 3B.

The depth of the knurl patterns 66, 68, 70 on the friction surface 34 of the sonotrode 32 and the support surface 24 of the support assembly 22 can be calibrated according to the thickness of the flanges 20, 38 of the lid portion 10 and the body portion 12 and the downward pressure of the sonotrode 32. If the depth of the knurl pattern 66, 68, 70 is too deep, the downward pressure could push the knurl substantially or completely through the flanges 20, 38 of the lid portion 10 and the body portion 12. Therefore, the thickness of the knurl is carefully calibrated to allow the knurl pattern to press into the flanges 20, 38 of the lid portion 10 and the body portion 12 sufficiently enough to engage and frictionally grip the flanges 20, 38, without sinking deep enough into the thickness of the flanges 20, 38 to compromise the structural integrity of the weld. Typically the depth of the knurl pattern 66, 68, 70 is calibrated as a small percentage of the thickness of the flanges 20, 38 of the lid portion 10 and the body portion 12. The knurl pattern can be formed by electro-machining, laser cutting, etching, and other well known processes.

Figure 12:
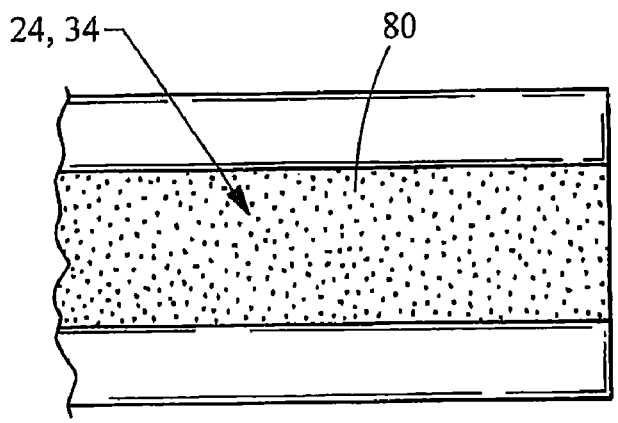
FIG. 12 is a perspective view of a portion of one of the friction surface and the support surface, wherein the surface has been grit blasted.
Figure 13:
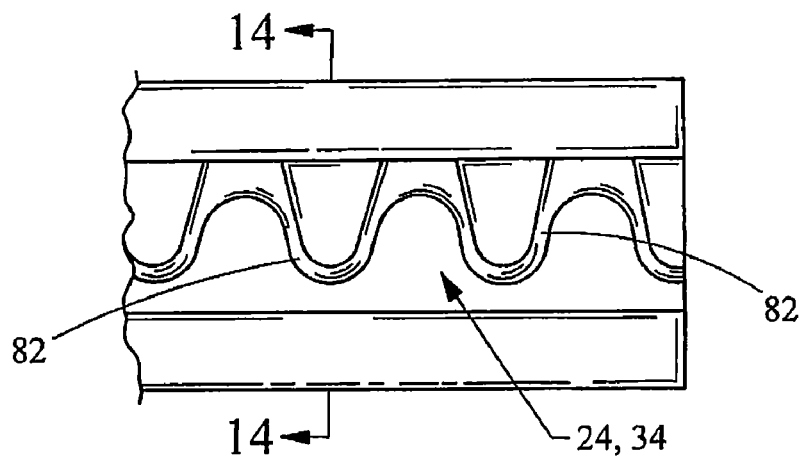
FIG. 13 is a perspective view of a portion of one of the friction surface and the support surface, wherein the surface includes a raised serpentine ridge extending thereabout.
Figure 14:
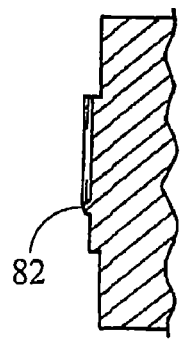
FIG. 14 is a sectional view taken along lines 14-14 of FIG. 13.

In another embodiment, the support surface 24 of the support assembly 22 and the friction surface 34 of the sonotrode 32 can have a textured surface rather than a knurled surface. Referring to FIG. 12, the support surface 24 of the support assembly 22 and the friction surface 34 of the sonotrode 32 can be sand-blasted or grit-blasted, thereby creating a textured surface 80. In still another embodiment, the support surface 24 of the support assembly 22 and the friction surface 34 of the sonotrode 32 can each include a raised ridge 82 extending thereabout. Referring to FIGS. 13 and 14, the raised ridge 82 can extend around the support surface 24 and the friction surface 34 in a serpentine manner. When the friction surface 34 of the sonotrode 32 contacts the lid portion 10 and the flanges 20, 38 of the lid portion 10 and the body portion 12 are held between the friction surface 34 and the support surface 24, the raised ridges 82 on the friction surface 34 and support surface 24 will create pressure points against the flanges 20, 38. Other embodiments can be envisioned wherein the support surface 24 of the support assembly 22 and the friction surface 34 of the sonotrode 32 each include a raised ridge 82 extending thereabout in a serpentine manner, and include portions that are grit blasted or sand blasted to increase the frictional grip of those portions. Additional embodiments can be envisioned wherein the support surface 24 of the support assembly 22 and the friction surface 34 of the sonotrode 32 each include a criss-cross pattern 70 as shown in FIGS. 9 and 15 wherein the lines forming the criss-cross pattern can be at a variety of intersecting angles.

Generally, the interior surfaces 42, 44 of the lid portion 10 and the body portion 12 are coated with a food compatible coating 72 prior to being assembled. These coatings 72 are typically organic coatings. A variety of coatings can be used on the interior surfaces of the lid portion and the body portion of the container, which are preferably satisfactory for food contact, to prevent corrosion of the inner surface of the metallic food container and to prevent the metal from contaminating the taste of the food placed therein. The coating can be any of the materials identified, for example, in U.S. Pat. No. 5,739,215, which are hereby incorporated by reference. Typically, the body portion and the lid portion have the inner surfaces coated prior to the lid portion being attached to the body portion. It is highly desirable that any process used to attach the lid portion 10 to the body portion 12 does not compromise the integrity of any coatings 72 placed thereon.

The downward force that the sonotrode 32 places on the lid portion 10 presses the flange 38 of the lid portion 10 and the flange 20 of the body portion 12 together. That downward force and the frequency of the reciprocal movement of the sonotrode 32 are carefully calibrated such that the frictional heat generated from the reciprocal relative motion between the lid portion 10 and the body portion 12 is sufficient to initially wipe out the coating between the lid portion 10 and the body portion 12 of the metallic container 14. Thereafter, the downward force of the sonotrode 32 can be increased such that the frictional heat generated from the reciprocal relative motion between the lid portion 10 and the body portion 12 creates a friction weld between the lid portion 10 and the body portion 12 of the metallic container 14, while being sufficiently low enough to prevent break-down of the coating 72 inwardly adjacent to the weld area.

Figure 6:
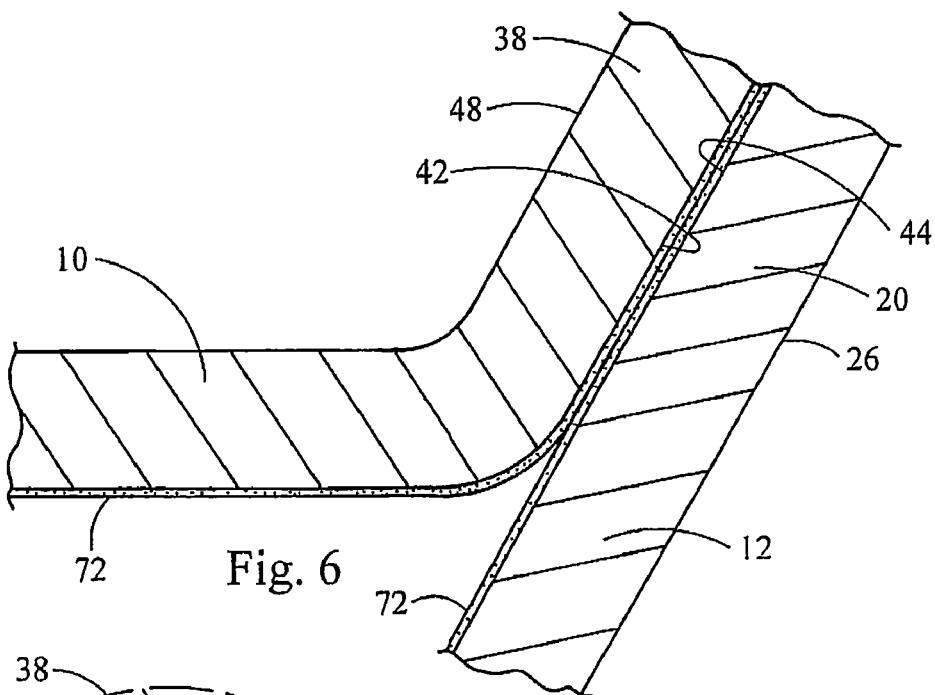
FIG. 6 is an enlarged view of a portion of FIG. 3A as indicated by the area labeled "FIG. 6" in FIG. 3A, prior to friction welding.

This allows the formation of a weld zone 74 between the inner surfaces 42, 44 of the flanges 20, 38 of the lid portion 10 and the body portion 12 while maintaining the integrity of the coating 72 on these surfaces 42, 44. Referring to FIG. 6, a close up view shows the flange 38 of the lid portion 10 and the flange 20 of the body portion 12 prior to welding. The inner surface 42 of the flange 38 on the lid portion 10 is shown to have a coating 72 placed thereon, and the inner surface 44 of the flange 20 on the body portion 12 is also shown to have a coating 72 placed thereon. The coatings 72, as well as protecting the contents of the metallic container 14, after the lid portion 10 is attached to the body portion 12, can also assist in the friction welding.

Thermoplastic coatings 72 can provide lubrication between the lid portion 10 and the body portion 12 to more easily allow relative motion between the two as the sonotrode 32 begins to move back and forth. As the frictional heat increases, the thermoplastic coatings 72 can become more fluid, thereby acting as a lubricant. After a short time, the heat begins to build up, and the downward pressure of the sonotrode 32 pushes the heated coating 72 away from the area directly between the friction surface 34 of the sonotrode 32 and the support surface 24 of the support assembly 22, or specifically, the weld zone 74. In the embodiment including raised serpentine ridges 82 on the friction surface 34 and the support surface 24, the pressure points created by the raised ridges 82 will push against the outer surfaces 26, 48 of the flanges 20, 38 thereby defining flow paths between the inner surfaces 42, 44 of the flanges 20, 38. The liquefied coating material 72 will flow, via the flow paths, outward, away from the weld zone 74. In this way, the raised serpentine ridges 82 assist in removing the coating material 72 from between the flanges 20, 38, thereby helping to insure a contaminant free weld zone 74. Coatings 72 formed of thermoset resins are observed to quickly become powdered and expelled outward from the weld zone 74.

Figure 8:
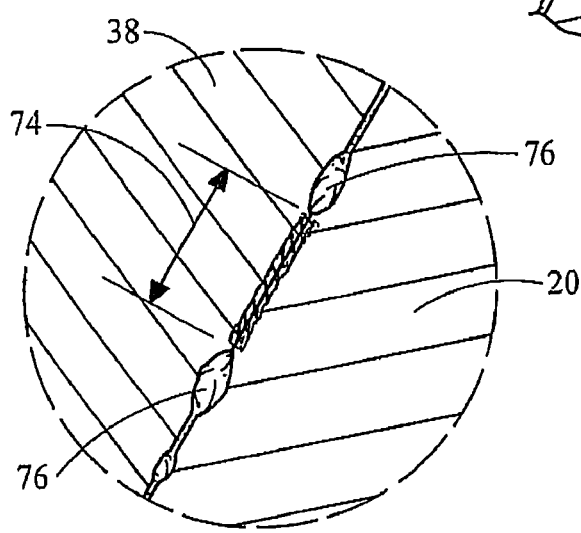
FIG. 8 is an enlarged portion of FIG. 7 as indicated by the area labeled "8" in FIG. 7.
Figure 7:
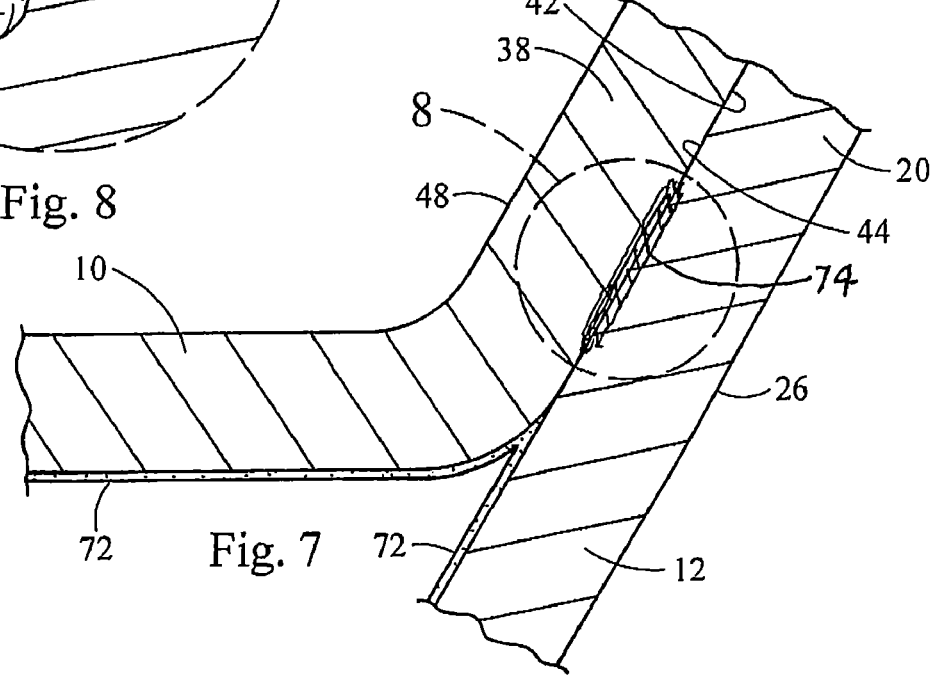
FIG. 7 is a view similar to FIG. 6, shown after friction welding.

Referring to FIGS. 7 and 8, once the coatings 72 are wiped out from the weld zone 74, the flange 38 of the lid portion 10 and the flange 20 of the body portion 12 are in direct contact within the weld zone 74. As reciprocal motion continues, the heat eventually builds up and forms a friction weld between the lid portion 10 and the body portion 12 within this weld zone 74. Referring specifically to FIG. 8, the weld zone 74 is the area wherein the lid portion 10 and the body portion 12 are actually welded to one another. The coating material 72 that was wiped out of the weld zone 74 can form pockets 76 of coating material 72 immediately adjacent each side of the weld zone 74. These pockets 76 of coating material 72 can help insure that there are no gaps in the coating material 72 at the point of welding.

Referring again to FIG. 3A, the friction surface 34 of the sonotrode 32 and the support surface 24 of the support assembly 22 are oriented at an angle 40 relative to the longitudinal axis 36 of the apparatus, along which the sonotrode 32 moves. Preferably, the friction surface 34 of the sonotrode 32 and the support surface 24 of the support assembly 22 are inwardly angled. The flanges 20, 38 on the lid portion 10 and the body portion 12 are correspondingly angled, as discussed previously. The angled orientation means that the downward force of the sonotrode 32 will provide a force to directly keep the flange 38 of the lid portion 10 and the flange 20 of the body portion 12 held together. This force will also act to push downward on the lid portion 10 relative to the body portion 12. This means that as the weld zone 74 is forming, the downward force pushing on the lid portion 10 will cause the weld zone 74 to smear radially inward. This increases the size of the weld zone 74 and the depth of the weld between the lid portion 10 and the body portion 12.

An alternative configuration for the friction surface 34 of the sonotrode 32 is shown in FIG. 3B to constitute an outwardly curved surface 33, which can be a simple constant radius joining the sonotrode outer surface 31 to the sonotrode bottom surface 35 as small as 0.25 mm. The constant radius friction surface 34 can have an outer surface as shown in FIG. 9, or more preferably FIG. 15. The constant radius friction surface 34 concentrates any vertical vibration transmitted from the sonotrode 32 to a narrow vertical region reflecting the amplitude of the vertical sonotrode vibration against a tangential portion of the lid portion flange 20. For example, using a 5 KW drive operating at about 20 KHz and at an amplitude of about 0.063 mm on a sonotrode having the general shape shown in FIG. 3B, the sonotrode 32 is driven downward into glancing tangential contact with the rim 38. The repeated glancing impact of the sonotrode 32 drives the friction surface 34 downward creating friction and heat that plows out the coatings on the lid and can body and creates a solid state weld between the flanges 20 and 38. The mechanical taper of about 7° provided by the angle 40 helps minimize the effect of any variation in the can lid and body at least within some tolerance range. The initial force applied can be about 3100 N but the force increases as the lid portion 10 is vibrated into place and welded to the can body portion 12, the whole welding process being completed in between about 180 to 220 milliseconds creating a weld zone 74 of about 0.7 to 0.75 mm.

The method of forming a metallic container 14 generally includes the steps of providing a pre-formed body portion 12, providing a pre-formed lid portion 10, placing the lid portion 10 onto the body portion 12 and applying a force to keep confronting surfaces of the lid portion 10 and the body portion 12 held in contact with one another, and reciprocally moving the lid portion 10 with respect to the body portion 12, thereby generating frictional heat between the lid portion 10 and the body portion 12 such that a friction weld is formed therebetween.

Referring to FIGS. 4, 4A, 5, and 5A, preferably, the body portion 12 is generally cylindrically shaped and is open at one end, the open end having an angled flange 20 extending circumferentially around the open end. A coating 72 is placed on the inner surface 44 of the body portion 12. The lid portion 10 is generally disk shaped and includes an angled flange 38 extending circumferentially around the disk perimeter. The angle 40 of the flange 20 on the body portion 12 being approximately equal to the angle 40 of the flange 38 on the lid portion 10. The lid portion 10 has a coating 72 placed on the inner surface 42 as well.

Preferably, the lid portion 10 and the body portion 12 are cold formed from a metallic material such as aluminum. It is to be understood that the metallic container 14 can be made from any suitable metallic material, and aluminum is being described here as one example of such a metallic material. The lid portion 10 is generally coated prior to the lid portion 10 being cold formed into pre-formed shape, and the body portion 12 is generally coated after being cold formed into the pre-formed shape.

The lid portion 10 and the body portion 12 are be placed together such that the inner surface 42 of the flange 38 of the lid portion 10 contacts the inner surface 44 of the flange 20 on the body portion 12. The force applied to keep the inner surface 42 of the flange 38 on the lid portion 10 held in contact with the inner surface 44 of the flange 20 on the body portion 12 should be between approximately 1800 N and approximately 7200 N. Preferably, the force is approximately 2250 N.

The lid portion 10 can be reciprocally moved relative to the body portion 12 at a rate between 15 KHz and 25 KHz by a sonotrode 32 supplied with about 5 kW of power. Preferably, the lid portion 10 is reciprocally vibrated at a frequency of approximately 20 KHz. The vibration can be a rotational vibration around the longitudinal axis 36, or linear vibration parallel to the axis 36, or any combination thereof such as an orbital vibration or a random direction vibration.

Preferably all steps are performed by providing an apparatus 16 such as that described above. The body portion 12 of the metallic container 14, generally filled with a suitable contents such as a food or beverage, is placed onto the base 18 of the apparatus 16. The lid portion 10 of the metallic container 14 is then placed onto the body portion 12 of the metallic container 14.

When the actuator 50 is activated, the sonotrode 32 begins to move downward toward the metallic container 14. As the sonotrode 32 and the shaft 54 on which the sonotrode 32 is mounted, begin to move downward, the rolling contacts 58 on the two halves 30A, 30B of the clamshell anvil 30 follow the cammed outer surface 56 of the shaft 54, thereby pushing the rolling contacts 58 outward and causing the two halves 30A, 30B of the clamshell anvil 30 to pivot against the biasing springs 60 mounted onto the support assembly 22.

When the rolling contacts 58 reach a point on the cammed outer surface 56 of the shaft 54 wherein the two halves 30A, 30B of the clamshell anvil 30 are pivoted to the closed position, the support surface 24 of the clamshell anvil 30 contacts the outer surface 26 of the flange 20 on the body portion 12 of the metallic container 14. The sonotrode 32 continues to move downward to the engaged position, wherein the friction surface 34 of the sonotrode 32 contacts the flange 38 on the lid portion 10 of the metallic container 14.

The actuator 50 pushes the sonotrode 32 downward with a force of between about 2250 N to 3110 N. After the sonotrode 32 reaches the engaged position, and the friction surface 34 of the sonotrode 32 is in contact with the flange 38 of the lid portion 10 and the support surface 24 of the support assembly 22 is in contact with the flange 20 of the body portion 12, the motor 52 begins to reciprocate or vibrate the sonotrode 32. The sonotrode 32 vibrates longitudinally or rotationally or a combination thereof relative to the support assembly 22, thereby reciprocally moving the lid portion 10 relative to the body portion 12 of the metallic container 14. The motor 52 vibrating the sonotrode 32 at a frequency of approximately 20 KHz can thereby generate sufficient frictional heat to wipe out the coating 72 on the inner surfaces 42, 44 of the body portion 12 and the lid portion 10 in the area of the weld zone 74 and form a friction weld between the flanges 20, 38 of the lid portion 10 and the body portion 12 within the weld zone.

In one embodiment using a purely rotational vibration, the actuator 50 moves the sonotrode 32 to the engaged position, and pushes the sonotrode 32 downward with a first downward force. The motor 52 is activated, and the sonotrode 32 is reciprocally rotated at a first frequency for a first predetermined amount of time. Specifically, the sonotrode 32 exerts sufficient force, the first downward force, and the motor 52 reciprocally rotates the sonotrode 32 at a selected frequency, the first frequency, until any thermoplastic coating material 72 placed on the inner surfaces 42, 44 of the flanges 20, 38 is caused to melt and become liquid. The first downward force and the first frequency are sufficient to create frictional heat to melt the coating material 72, however they are not sufficient to create enough frictional heat to form a weld. This melted coating material 72 acts as a lubricant to allow continued rotational movement between the flanges 20, 38.

Since the coating materials 72 could compromise the integrity of any weld formed between the flanges 20, 38, the downward force and the frequency of rotation are held at the first downward force and the first frequency until the melted thermoplastic coating material 72 has migrated away from the weld zone 74. It is possible to use the friction surface 34 and support surface 24 illustrated in FIGS. 13 and 14 to assist in this migration. The support surface 24 and the friction surface 34 each have a raised ridge 82 extending therearound in a serpentine pattern such that when the friction surface 34 of the sonotrode 32 contacts the lid portion 10 and the flanges 20, 38 of the lid portion 10 and the body portion 12 are held between the friction surface 34 and the support surface 24, the raised ridges 82 on the friction surface 34 and support surface 24 will create pressure points against the flanges 20, 38. The first downward pressure is adapted to apply sufficient pressure, such that the raised serpentine ridges 82 on the friction surface 34 and the support surface 24 create pressure points against the outer surfaces 26, 48 of the flanges 20, 38, thereby defining flow paths between the inner surfaces 42, 44 of the flanges 20, 38. The flow paths allow the melted thermoplastic coating material 72 to more readily flow from within the weld zone 74, and the reciprocal rotation of the sonotrode 32 will help push the melted thermoplastic coating material 72 through these flow passages. Similar flow patterns may occur for powdered non-thermoplastic coatings.

Typically, when the purely rotational vibration described above is applied to a typical carbonated beverage can, it takes approximately two to six hundredths of a second to wipe out the coatings 72 from the weld zone 74. Once the coating material has been wiped out, the downward pressure of the sonotrode 32 can be increased to a second downward force and the frequency of reciprocal rotation of the sonotrode 32 can be increased to second frequency. The downward pressure and the frequency are desirably increased to levels appropriate to create sufficient heat and pressure to form a friction weld between the flanges 20, 38, and held at those levels until the friction weld is formed. When applied to a typical carbonated beverage can, this portion of the process takes approximately one to two tenths of a second.

Preferably, the first downward force and the first frequency used in the purely rotational process are between approximately sixty percent and approximately seventy percent of the second downward force and the second frequency. As previously discussed, the downward force and the frequency are application dependant. The downward force and the frequency of reciprocal rotation, depend on the thickness of the flanges 20, 38, the material that is being welded, the diameter of the sonotrode 32, and other factors. For example, in a particular application, the downward pressure and frequency of reciprocal rotation necessary to create a friction weld between the flanges 20, 38 of the lid portion 10 and the body portion 12 are 2250 N and 20 KHz, respectively. These are the second downward force and the second frequency. The first downward force and the first frequency would be sixty to seventy percent of the second downward force and second frequency, or between 1350 N and 1575 N and between 12 and 14 KHz, respectively. The first vibrational reciprocation can also be at a reduced power level of about fifty to seventy-five percent of the second.

When using a essentially purely vertical mode for the reciprocal vibration, one can use a 5 KW drive operating at about 20 KHz and at an amplitude of about 0.063 mm on a sonotrode having the general shape shown in FIG. 3B. The sonotrode 32 can initially driven downward into glancing tangential contact with the rim 38 at an initial force of about 3100 N. The repeated glancing impact of the sonotrode 32 drives the friction surface 34 downward creating friction and heat that plows out the coatings on the confronting interior surfaces of the lid portion and can body. The mechanical taper of about 7° provided by the angle 40 helps minimize the effect of any variation in the can lid and body at least within some tolerance range. With the initial force applied, the lid portion 10 is vibrated into place and a solid state weld is created between the flanges 20 and 38 that secures the lid portion 10 to the can body portion 12, the whole welding process being completed in between about 180 to 220 milliseconds creating a weld zone 74 of about 0.7 to 0.75 mm. The containers welded in accordance with this process satisfactorily pressure test up to at least 10 Barr and with some containers up to nearly 15 Barr.

The methods and apparatus 16 described above provide techniques of attaching the lid portion 10 to the body portion 12 of a metallic container 14 that create a solid metal seal between the lid portion 10 and the body portion 12, while maintaining the integrity of any coatings 72 placed on the inner surfaces 42, 44 of either component. The processes are quicker than any known prior processes, and eliminate additional material necessary for rolling the edges of the lid portion 10 and the body portion 12 onto one another. Furthermore, no intermediate material is necessary between the flanges 20, 38 of the lid portion 10 and the body portion 12. The methods and apparatus 16 described herein create a weld directly between the flanges 20, 38 of the lid portion 10 and the body portion 12 with no intermediate material or gaskets of any kind necessary. The temperatures of the process described above remain relatively low compared to prior art processes, thereby making it possible to maintain a food suitable coating 72 the inner surfaces 42, 44 of the components.

In accordance with the provisions of the patent statutes, the present invention has been described in what is considered to represent its preferred embodiments. However, it should be noted that the invention can be practiced otherwise than as specifically illustrated and described.

What is claimed is:

1. An apparatus for attaching a lid portion of a metallic container to a body portion of the container, the container body portion including a flange having an inner surface and an outer surface, the apparatus comprising:

a base, and a support assembly movable relative to the base, the support assembly including a support surface for engaging the flange outer surface of the metallic container body portion, a sonotrode having a friction surface, the sonotrode being movable relative to the base between a retracted position, wherein the friction surface is spaced from the metallic container, and an engaged position, wherein the friction surface engages the lid portion, and a motor for vibrating the sonotrode relative to the support assembly when situated in the engaged position to move the lid portion relative to the body portion such that frictional heat generated from the vibrational motion welds together the lid portion and the flange of the metallic container body, wherein the support assembly includes a frame, and a clamshell anvil, the clamshell anvil comprising two halves that are pivotally mounted onto opposing portions of the frame for pivotal movement between an open position and a closed position, and springs biasing the two halves of the clamshell anvil to the open position, and wherein the sonotrode is supported on a shaft, the shaft having a cammed outer surface, portions of the pivotally mounted clamshell anvil halves engaging the cammed outer surface, such that when the sonotrode is in the retracted position, the pivotally mounted clamshell anvil halves engage the shaft at a point where the shaft allows the clamshell anvil halves to pivot to the open position, and when the shaft and the sonotrode begin to move downward, the cammed outer surface of the shaft forces the clamshell anvil halves to pivot to the closed position wherein the support surface engages the flange of the body portion of the metallic container.

2. The apparatus of claim 1, wherein the sonotrode is moved in the engaged position to confront the support surface so that portions of the lid and the body of the metallic container are held in contact with one another between the support surface of the support assembly and the friction surface of the sonotrode.

3. The apparatus of claim 1, wherein the motor is adapted to reciprocally move the sonotrode at a rate of between 15 KHz and 25 KHz.

4. The apparatus of claim 3, wherein the motor is adapted to reciprocally rotate the sonotrode around a longitudinal axis of the metallic container.

5. The apparatus of claim 1 or 4, wherein the motor is adapted to reciprocally vibrate the sonotrode longitudinally relative to the metallic container longitudinal axis.

6. The apparatus of claim 1, further including an actuator for advancing and retracting the sonotrode between the engaged position and the retracted position, wherein when the sonotrode is moved to the engaged position, the actuator moves the sonotrode toward the base such that the sonotrode exerts a force to hold portions of the lid portion and the body portion of the metallic container in contact with one another between the support surface of the support assembly and the friction surface of the sonotrode, the actuator being adapted to provide a force between approximately 1300 N and approximately 7200 N.

7. The apparatus of claim 1, wherein the cammed outer surface of the shaft is shaped such that the clamshell anvil halves are forced to pivot to the closed position prior to the sonotrode reaching the engaged position.

8. The apparatus of claim 1, wherein at least one of the clamshell anvil halves includes a stop extending from an inner surface of the clamshell anvil half, positioned vertically above the support surface, such that when the sonotrode retracts from the lid portion of the metallic container after welding, if the lid portion sticks to the friction surface of the sonotrode, the stop will contact the lid portion, thereby holding the metallic container down as the sonotrode retracts upward.

9. The apparatus of claim 1, wherein the support surface of the support assembly has a textured surface such that the support surface will frictionally engage the outer surface of the flange portion of the body of the metallic container to prevent sliding movement of the flange of the body portion relative to the support assembly.

10. The apparatus of claim 1, wherein the friction surface of the sonotrode has a textured surface such that the friction surface will frictionally engage the lid portion of the metallic container to prevent sliding movement of the lid relative to the sonotrode.

11. The apparatus of claim 1, wherein at least one of the support surface of the support assembly and the friction surface of the sonotrode has a knurled pattern formed therein.

12. The apparatus of claim 11 wherein the knurled pattern comprises a triangular knurl pattern.

13. The apparatus of claim 1, wherein at least one of the support surface and the friction surface are grit blasted.

14. The apparatus of claim 1, wherein at least one of the support surface and the friction surface each have a raised ridge in a serpentine pattern.

15. The apparatus of claim 1, wherein an interior surface of the body portion and the lid portion of the metallic container include a coating applied thereto, wherein when the sonotrode is moved to the engaged position, the sonotrode exerts a downward force to hold portions of the lid portion and the body portion of the metallic container in contact with one another between the support surface of the support assembly and the friction surface of the sonotrode, the downward force of the sonotrode and the frequency of vibration of the sonotrode provided by the motor being such that the frictional heat generated from the relative motion between the lid portion and the body portion is sufficient to create a friction weld between the lid portion and the body portion of the metallic container.

16. The apparatus of claim 1, wherein at least one of the friction surface of the sonotrode and the support surface of the support assembly are angled relative to the longitudinal axis of the apparatus.

17. An apparatus for attaching a lid portion of a container to a body portion of the container, the container body portion having a longitudinal axis and including an obliquely angled flange concentric with respect to the axis and having an inner surface and an outer surface, the lid portion including an obliquely angled flange having an inner surface and an outer surface, the apparatus comprising:
 a base, and a support assembly movable relative to the base, the support assembly including a support surface configured to engage the obliquely angled flange outer surface of the container body portion,
 a sonotrode having a friction surface, the sonotrode being movable relative to the base between a retracted position where the friction surface is spaced from the container, and an engaged position where the friction surface engages the obliquely angled flange outer surface of the container lid portion so that the inner surface of the obliquely angled flange of the container lid portion contacts the inner surface of the obliquely angled flange of the container body portion, and
 a motor coupled to the sonotrode and configured to vibrate the sonotrode relative to the support assembly when situated in the engaged position, to move the lid portion relative to the body portion such that frictional heat generated from the vibrational motion welds together portions of the inner surface of the obliquely angled flange of the container lid portion and the inner surface of the obliquely angled flange of the container body portion,
 wherein the support assembly includes a frame, and a clamshell anvil, the clamshell anvil comprising two halves that are pivotally mounted onto opposing portions of the frame for pivotal movement between an open position and a closed position, and springs biasing the two halves of the clamshell anvil to the open position, and
 wherein the sonotrode is supported on a shaft, the shaft having a cammed outer surface, portions of the pivotally mounted clamshell anvil halves engaging the cammed outer surface, such that when the sonotrode is in the retracted position, the pivotally mounted clamshell anvil halves engage the shaft at a point where the shaft allows the clamshell anvil halves to pivot to the open position, and when the shaft and the sonotrode begin to move downward, the cammed outer surface of the shaft forces the clamshell anvil halves to pivot to the closed position wherein the support surface engages the flange of the body portion of the metallic container.

18. The apparatus of claim 17, wherein the motor is further configured to reciprocally move the sonotrode at a rate of between 15 KHz and 25 KHz.

19. The apparatus of claim 17, further comprising an actuator coupled to the sonotrode, the actuator configured to move the sonotrode between the engaged position and the retracted position along an apparatus longitudinal axis, wherein when the sonotrode is moved to the engaged position, the actuator is adapted to cause the sonotrode to exert a force to hold portions of the lid portion and the body portion of the container in contact with one another between the support surface of the support assembly and the friction surface of the sonotrode, the actuator capable of providing a force between approximately 1300 N and approximately 7200 N.

20. The apparatus of claim 19, wherein a portion of each of the inner surfaces of the obliquely angled flange of the respective body portion and lid portion of the container includes a coating, wherein when the sonotrode is moved to the engaged position, the actuator is adapted to cause said sonotrode to exert a first force to hold portions of the lid portion and the body portion of the container in contact with one another, the first force and a frequency of vibrational motion of the sonotrode configured to generate a first frictional heat to remove the coating from portions of each of the inner surfaces of the obliquely angled flange of the respective body portion and lid portion of the container to form a weld zone.

21. The apparatus of claim 20, wherein after the sonitrode is moved to the engaged position, the actuator is configured to increase the force of the sonotrode to a second force to hold portions of the lid portion and the body portion of the container in contact with one another, the second force and the frequency of vibrational motion of the sonotrode configured to generate a second frictional heat, greater than the first frictional heat, to weld the inner surfaces of the obliquely angled flange of the respective body portion and lid portion of the container together along the weld zone.

22. The apparatus of claim 20, wherein after the sonotrode is moved to the engaged position, the motor is configured to increase the frequency of vibrational motion of the sonotrode to a second frequency, the first force and the second frequency of vibrational motion of the sonotrode configured to generate a second frictional heat, greater than the first frictional heat, to weld the inner surfaces of the obliquely angled flange of the respective body portion and lid portion of the container together along the weld zone.

23. The apparatus of claim 19, wherein the container body portion longitudinal axis and the apparatus longitudinal axis are in alignment, and the support surface of the support assembly is obliquely angled relative to the apparatus longitudinal axis at an angle substantially identical to an angle of the obliquely angled flange of the container body portion, wherein the support surface of the support assembly further comprises a textured surface to frictionally engage the outer surface of the obliquely angled flange of the container body portion.

24. The apparatus of claim 17, wherein the sonotrode is sized to fit within a space defined by the obliquely angled flange outer surface of the container lid portion.

25. The apparatus of claim 24, wherein the sonotrode includes a cylindrical body having an outward surface joined to a bottom surface by an outwardly curved surface, the sonotrode being movable along an apparatus longitudinal axis, the outward surface being generally parallel to the apparatus longitudinal axis and the bottom surface being generally perpendicular to the apparatus longitudinal axis, where the friction surface is included along the outwardly curved surface.

26. The apparatus of claim 25, wherein the outwardly curved surface of the sonotrode is configured to contact the obliquely angled flange outer surface of the container lid portion along circumferential portions thereof.

27. The apparatus of claim 25, wherein the outwardly curved surface of the sonotrode is configured to tangentially glance the obliquely angled flange outer surface of the container lid portion.

28. The apparatus of claim 27, wherein the motor is further configured to reciprocally move the sonotrode at a rate so that repeated tangential glancing contact between the outwardly curved surface of the sonotrode and the obliquely angled flange outer surface of the container lid portion generates said frictional heat to weld together portions of the inner surface of the obliquely angled flange of the container lid portion and the inner surface of the obliquely angled flange of the container body portion.

* * * * *